United States Patent [19]

Hirosawa

[11] Patent Number: 4,884,224

[45] Date of Patent: Nov. 28, 1989

[54] METHOD FOR GENERATING IMAGE CONTOUR DATA AND APPARATUS THEREFOR

[75] Inventor: Makoto Hirosawa, Kyoto, Japan

[73] Assignee: Dainippon Screen Mfg. Co., Ltd., Japan

[21] Appl. No.: 147,354

[22] Filed: Jan. 22, 1988

[30] Foreign Application Priority Data

Jan. 23, 1987 [JP] Japan .................................. 62-13837
Jul. 10, 1987 [JP] Japan .................................. 62-171165

[51] Int. Cl.$^4$ .......................... G06F 15/20; G05B 1/00
[52] U.S. Cl. ..................................... 364/550; 250/202; 364/518; 382/22
[58] Field of Search ......................... 364/550, 518–523; 382/22, 25, 27, 60; 358/107; 250/202

[56] References Cited

U.S. PATENT DOCUMENTS

| | | | |
|---|---|---|---|
| 4,361,830 | 11/1982 | Honma et al. | 382/22 |
| 4,441,020 | 4/1984 | Sakamoto et al. | 250/202 |
| 4,453,084 | 6/1984 | Brouwer | 250/202 |
| 4,561,061 | 12/1985 | Sakamoto et al. | 364/550 |
| 4,672,557 | 6/1987 | Tamura et al. | 250/202 |
| 4,703,512 | 10/1987 | Saka et al. | 382/22 |
| 4,764,669 | 8/1988 | Decker et al. | 250/202 |

*Primary Examiner*—Parshotam S. Lall
*Assistant Examiner*—Kevin J. Teska
*Attorney, Agent, or Firm*—Ostrolenk, Faber, Gerb & Soffen

[57] ABSTRACT

An image contour data generating apparatus comprises a digitizer for holding an original film having a section which is bounded by a particular contour. The digitizer serves for inputting approximate information regarding the position of the contour on the original film. The apparatus also includes an image sensor in the digitizer which is moved to the inputted approximate position of the contour for detecting the accurate image contour position at that position, an arithmetic device for calculating an absolute contour line position from the inputted approximate contour position data and from the accurate image contour position data obtained by the image sensor, and a memory for storing the contour position data obtained from the calculation. The apparatus is such that the original film is not moved from its location on the digitizer from the time when the approximate image contour information is inputted until after the accurate contour position is detected.

26 Claims, 15 Drawing Sheets

METHOD FOR GENERATING IMAGE CONTOUR DATA AND APPARATUS THEREFOR

BACKGROUND OF THE INVENTION

1. Field of the Invention

The present invention relates to an apparatus for generating contour signal data of a desired image region of an original such as a photograph and to a method and apparatus for producing a cut-out mask based on the generated data. More specifically, it relates to a method and apparatus for generating image contour data for producing a cut-out mask used in recording a reproduction image only of the desired image region.

2. Description of the Prior Art

In photoprocessing, a specified image region of an original is extracted to be reproduced in the following manner. First, the contour of the image region is displayed and a mask is prepared in which either the exterior or the interior of the contour is made transparent and the other is made opaque. This film is called a "cut-out mask". This mask is superimposed in registration with the original. Thereafter, it is exposed as it is. Consequently, a reproduction is obtained in which only the desired image region is extracted.

A method for generating an image contour for easily producing the above mentioned cut-out mask is disclosed in U.S. Pat. No. 4,441,020 entitled "Method for Tracing an Object" issued on Apr. 3, 1984 and assigned to the assignee of this invention. However, the above mentioned method has a disadvantage that errors occasionally occur in reading data for producing the cut-out mask.

In view of the foregoing, an improved method for producing the cut-out mask eliminating the above described disadvantage was proposed. This is disclosed in U.S. Pat. No. 4,561,061 entitled "Method of Tracing/Recording Image Lines and Apparatus Therefore" issued on Dec. 24, 1985 and assigned to the assignee of the present invention. FIG. 1 is a block diagram showing the structure of the contour tracing/recording apparatus disclosed therein. The conventional image contour data generating apparatus comprises a coordinate reader 213 for inputting approximate outline data, a table 214 for reading the actual contour data by an image sensor 209, a CPU 212 for the image data processing, and so on.

In the conventional image contour data generating apparatus, first, approximate outline positions of the original are inputted by the coordinate reader 213 to be stored in the memory 219 through the CPU 212. Thereafter, the original is moved to the table 214. The table 214 is moved based on the inputted data of the memory 219 and the accurate contour data is read by the image sensor 209.

However, this improved method for generating image contour still has the following disadvantages. One of the disadvantages is that reading errors can not be completely eliminated since the precision of the data reading image sensor is not good. The other disadvantage is that data reading takes long time since the data reading operation is carried out in two steps. Namely, in the reading of the contour data, the reading of the approximate outline data is carried out by the coordinate reader and the detection of the accurate outline should be carried out on the separate table. A further and most significant disadvantage is that the original film, the approximate data of which is read, must be moved from the coordinate reader to the reading table for the image sensor in generating the image contour. Consequently, reading errors grow larger.

SUMMARY OF THE INVENTION

Therefore, a main object of the present invention is to provide an image contour data generating apparatus for producing a cut-out mask in which reading error does not occur.

Another object of the present invention is to provide a highly efficient image contour data generating apparatus.

The above objects of the present invention can be attained by carrying out the input of the approximate outline position on the original film from which data is to be read and the detection of the accurate outline position in the same place, with the detection of the accurate outline position being carried out by a high precision image sensor.

Briefly stated, the image contour generating apparatus of the present invention comprises original film holding means for holding an original film the having an image whose contour is to be determined, approximate position input means connected to the original film holding means for inputting a scanning position corresponding to a selected point on said image contour, contour position detection means connected to the original film holding means and moving to the inputted position for scanning the image in the area of said scanning position and generating an output signal indicative of the actual contour of the image in the area of said position responsive to said output signal for arithmetically determining the actual contour of said image in the area of said scanning position.

Since the image contour generating apparatus is structured as described above, the input of the approximate outline position and the detection of the accurate outline position of the original film from which the data is read are effected on the same place. Consequently, the movement of the original film can be dispensed with, whereby an image contour data generating apparatus in which no reading error occurs can be provided.

According to a preferred embodiment, the image contour data generating apparatus comprises a digitizer for holding the original film and for indicating approximate image outline position on the original film, a charge coupled device (CCD) which is moved to the indicated position for detecting the accurate outline position, arithmetic processing means for converting the accurate outline position detected by the CCD into the absolute position on the digitizer, and a memory for storing the processed absolute coordinate.

The image contour generating apparatus structured as above permits reading of high precision image contour.

According to a more preferred embodiment, the image contour data generating apparatus comprises a cutter for cutting a peel off film which is to be the cut-out mask.

By virtue of the image contour data generating apparatus structured as described above, a desired cut-out mask can be easily formed based on the absolute coordinate stored in the memory by mounting a peel off film instead of the original on the digitizer plane.

According to another preferred embodiment of the present invention, the method for generating image contour data comprises the steps of mounting an original film on a digitizer, inputting the desired approximate image outline position on the original film on the digitizer, moving an image sensor to the inputted position, reading the accurate image outline position by the image sensor, and storing the read accurate image outline position in the memory means.

Since the method for generating the image contour comprises the above described steps, the accurate image outline position is read immediately after the input of the approximate outline. Consequently, a highly efficient method for generating image contour can be provided.

These objects and other objects, features, aspects and advantages of the present invention will become more apparent from the following detailed description of the present invention when taken in conjunction with the accompanying drawings.

DESCRIPTION OF THE PREFERRED EMBODIMENTS

The preferred embodiments of the present invention will be hereinafter described with reference to the figures.

A first embodiment of the image contour signal data generating apparatus will be described with reference to FIGS. 2 to 6.

Figure 2:
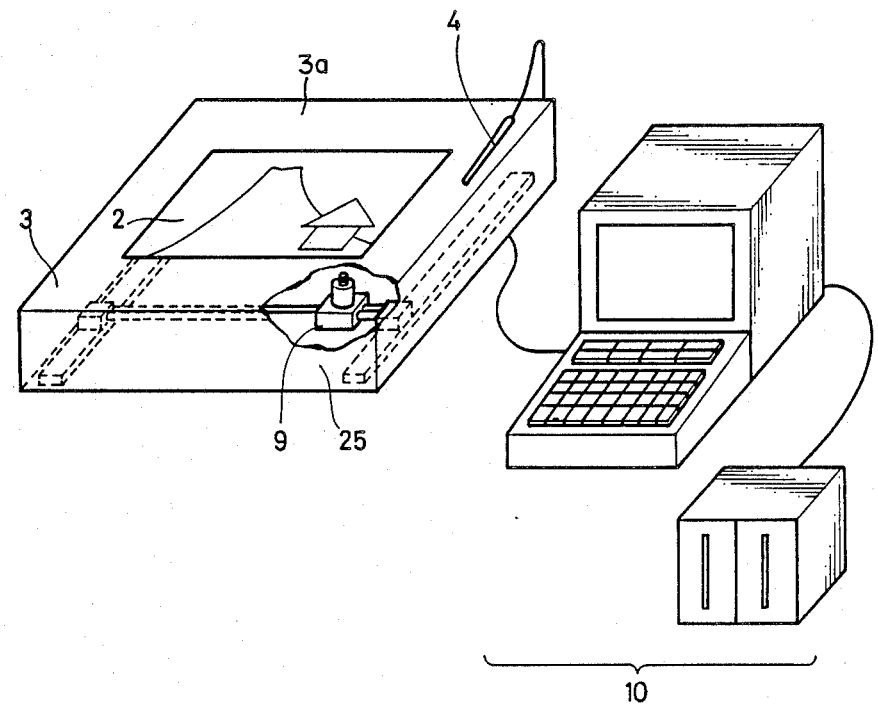
FIG. 2 shows the whole structure of the image contour data generating apparatus in accordance with the present invention.

FIG. 2 shows the entire structure of the image contour data generating apparatus in accordance with the present invention. Referring to FIG. 2, the apparatus comprises an a single integrated input apparatus 25 for holding an original film 2 and for obtaining an image contour signal from the original film 2, and a control system 10 for producing desired mask data based on the image contour signal provided from the input apparatus 25 and for controlling the input apparatus 25 and the like.

The input apparatus 25 comprises a digitizer 3 having a film holding surface 3a for holding the original film 2 thereon, a stylus pen 4 appended to the digitizer 3 which is moved along the desired contour on the original film 2 for inputting the approximate outline position on the original film 2, and an image sensor 9 which is moved to the position determined by the coordinates inputted with the stylus pen for detecting accurate outline position data.

Figure 3:
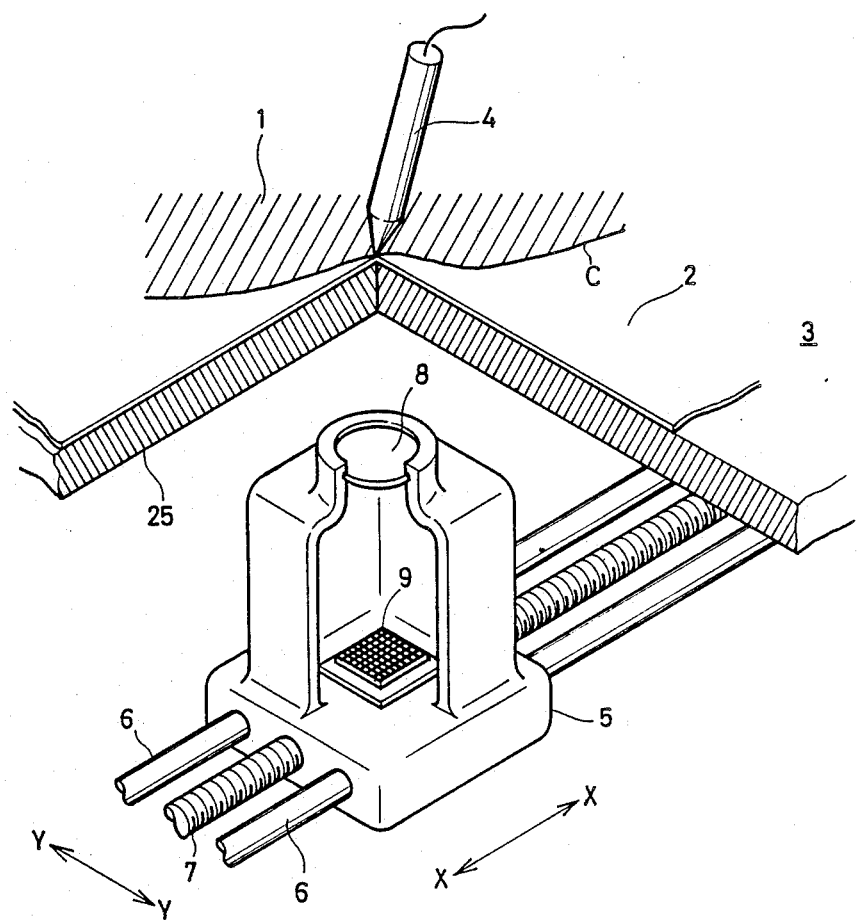
FIG. 3 shows a main portion of a digitizer in accordance with the present invention.

FIG. 3 is a cross sectional view showing a main portion of the digitizer 3. An original film 2 is mounted on the digitizer 3, the film having an objective image region 1 surrounded by a contour c, the data of which should be generated.

When the stylus pen 4 is set on an arbitrary position, the digitizer 3 outputs that position as a X-Y coordinate value. In this embodiment, a digitizer having a transparent original mounting base is employed. Therefore, light emitted from a light source (which is not shown) arranged above an original film 2 can penetrate downward through the digitizer 3.

A carriage 5 movable along the digitizer is arranged below the digitizer 3.

The carriage 5 is supported by a guide axis 6 in the direction of the X axis and is driven in the direction of the X axis by a driving thread 7 in the same direction. The guide axis 6 and the thread axis 7 are connected to a slider not shown, which moves in the direction of the Y axis. The driving means for both X axis and Y axis directions are structured in a similar manner as a known X-Y plotter or the like.

The upper surface of the carriage 5 is formed of a light intercepting case as shown in the figure. An image forming lens 8 is provided on the upper end thereof. The image of the objective region of the original 2 mounted on the digitizer 3 is projected and formed on the image sensor 9 by the lens 8. This image sensor 9 is a matrix type in which a number of photoelectric elements are arranged in a lattice. The center of the image sensor 9 is located at a position which is in registration with a the optical axis of lens 8.

Figure 4:
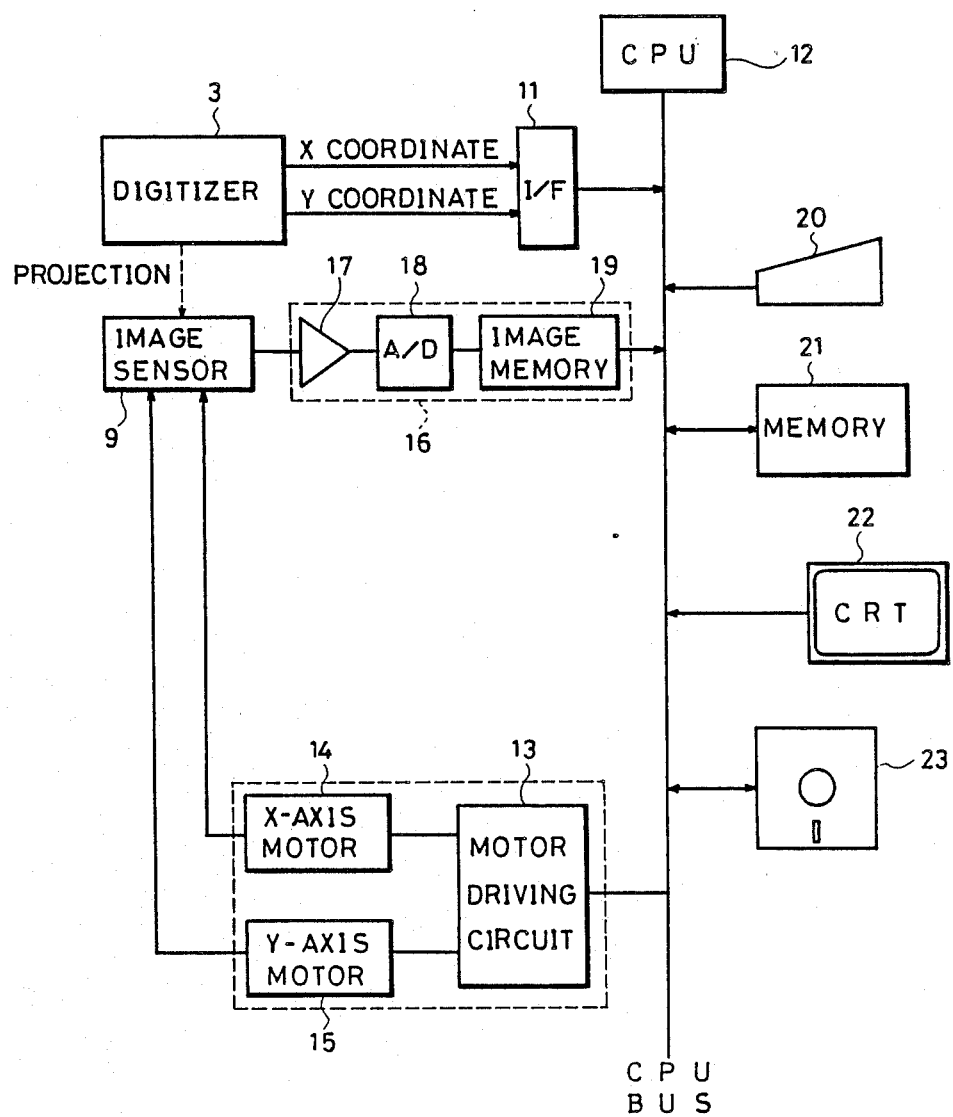
FIG. 4 is a block diagram showing the control system for operating the apparatus shown in FIG. 2.

FIG. 4 is a block diagram showing the control system for operating the apparatus shown in FIG. 2. Referring to FIG. 4, the control system comprises a CPU 12, an operation panel 20 for input/output, a memory 21 for storing the image contour read by the image sensor, a CRT 22, an external memory device 23, an interface 11 for receiving a signal inputted by the digitizer, a motor driving portion for moving the image sensor to the position inputted by the stylus pen on the digitizer 3, and an image processing portion 16 for processing the contour according to the data detected by the image sensor 9. The motor driving portion comprises a motor driving circuit 13, an X axis motor 14 for moving the image sensor in the direction of the X axis and a Y axis motor 15 for moving the image sensor 9 in the direction of the Y axis. The image processing portion 16 comprises an amplifier 17, A/D converter 18 and an image memory 19. A signal from each photoelectric element of the image sensor 9 is converted into a digital signal and stored in the image memory 19. On this occasion, said signal is stored in the address corresponding to the position of arrangement of each photoelectric element.

Figure 5A:
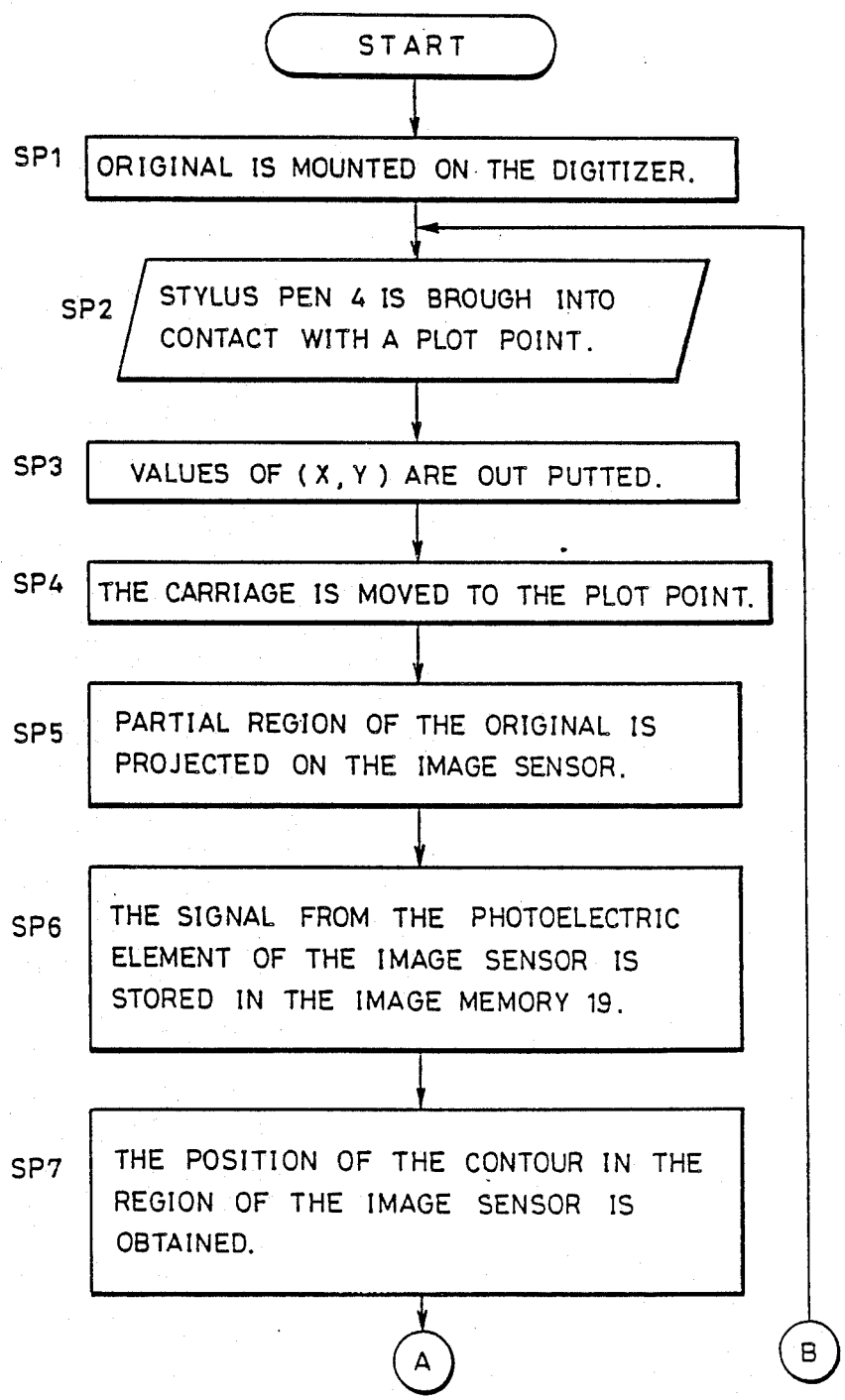
FIGS. 5A and 5B together form a flow chart showing the process for generating the image contour data.
Figure 5B:
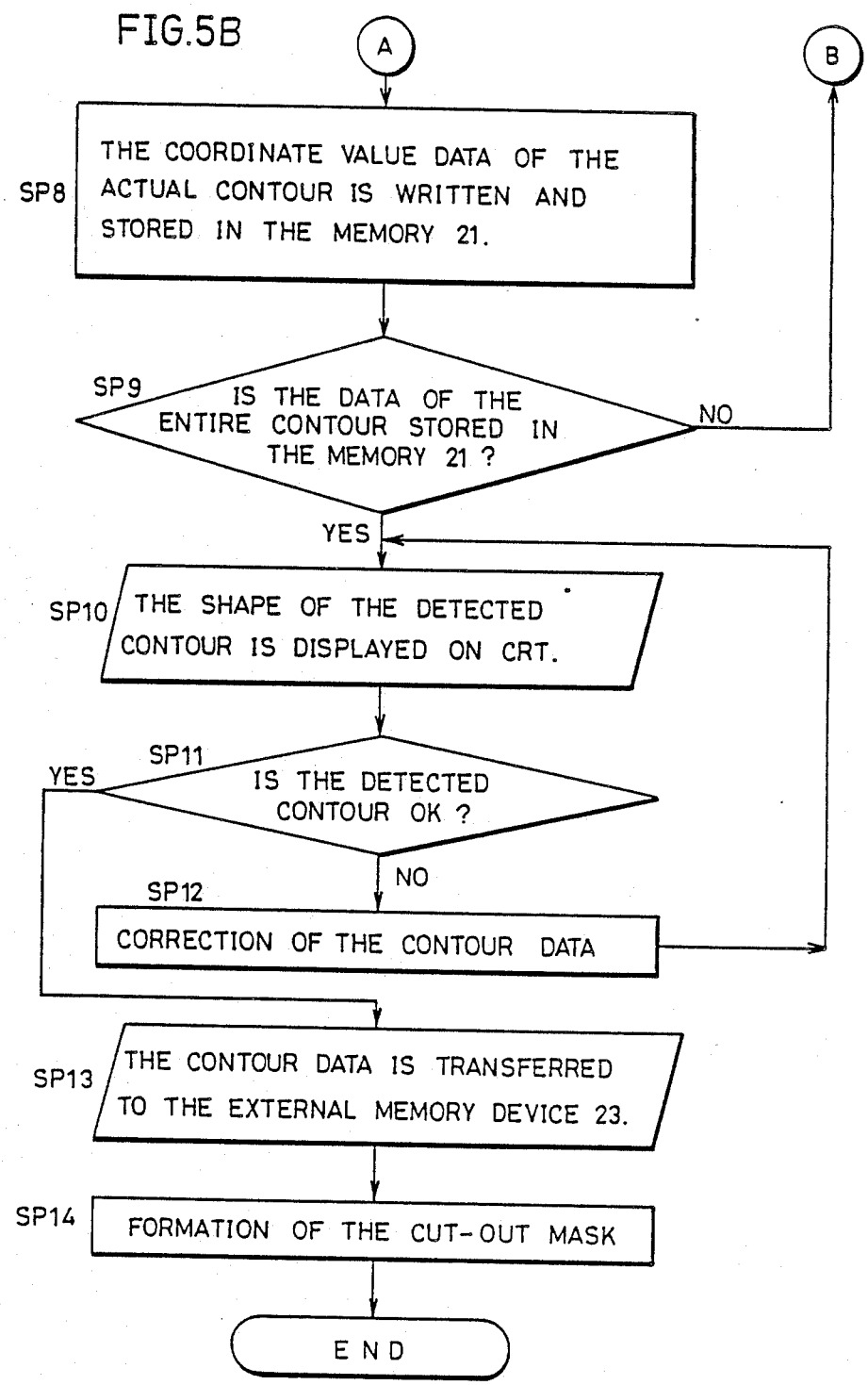

The process for generating the image contour data will now be described. FIG. 5 is a flow chart showing the process. First, an original 2 whose image contour is to be read is mounted on the digitizer (step 1). A stylus pen 4 is brought into contact with a plot point on the contour of the mounted original 2 (step 2). As a result, the values of the X coordinate and Y coordinate are outputted (step 3). These values of the X coordinate and Y coordinate are inputted to the CPU 12 through interface 11. In accordance with the coordinate data, the CPU 12 outputs an instruction to the motor driving circuit 13 and controls the X axis motor 14 and Y axis motor 15. The carriage 5 is moved to a position where the optical axis of the image forming lens 8 is aligned with the set point of the stylus pen 4 (step 4). An image of the partial region of the original 2 is projected to form image on the image sensor 9 by the light from a light source provided above the digitizer 3 (step 5).

Since the stylus pen 4 is in contact with the concerned region of the original 2, it presents an obstruction in the projection and image forming of the image. Therefore, after the X-Y coordinate value of the plot point is outputted, the stylus pen 4 is retracted from the concerned region. The positions are continuously plotted in the similar manner. During this process, the apparatus operates to obtain the image contour data at each position plotted. Preferably, the coordinate data of the contour in each region thus outputted is appropriately stored in the CPU to control the movement of the carriage 5.

Figure 6:
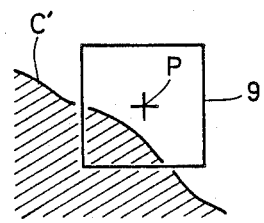
FIG. 6 shows the relation between the set position of a stylus pen and the accurate outline position of the original film.

If the set position of the stylus pen 4 is on the image contour c, the contour image c' will be projected through the center of the image sensor 9. However, manual setting of the stylus pen 4 usually involves some error. Therefore, the contour image c' is projected on the position slightly deviated from the center P of the image sensor 9 as shown in FIG. 6.

Signals corresponding to the density of the projected image are outputted from each of the photoelectric elements arranged in the matrix constituting the image sensor 9. The outputted signals are inputted to the image processing portion 16.

The signal from each of the photoelectric element of the image sensor 9 is converted to a digital signal and stored in the image memory 19 (step 6).

The contents in the image memory 19 are transmitted to the CPU 12. The position of the contour in the region of the image sensor 9 is obtained (step 7). This can be obtained from arithmetic operation such as two dimensional first order differential, second order differential and the like based on the contents written in the memory 19. Details of the arithmetic processing means are disclosed in "Digital Picture Processing", Azriel Rosenfeld et al., Academic Press Inc, 1976.

Thus, the position of the contour in the region of the image sensor 9 is obtained as a series of X-Y coordinate values with the center of the image sensor 9 being the origin. (Hereinafter, the term "coordinate value of the control region" means a series of coordinate values of the contour, namely, the absolute coordinate values on the original in the specification.) The CPU 12 carries out an arithmetic process based on the coordinate value data and the previously inputted coordinate value data of the center of the image sensor 9 corresponding to the set position of the stylus pen 4. Consequently, X-Y coordinate values are detected indicating the position of the desired image contour.

The coordinate value data is written and stored in the memory 21 according to the instruction from the CPU 12 (step 8).

Thereafter, the stylus pen 4 is brought into contact with the next plot point on the image contour c and, in a similar manner, the coordinate value data of the image contour on that position is written in the memory 21.

This operation is repeated for the entire contour surrounding the desired image region (step 9). As a result, the coordinate value data for the contour constituting one closed loop is stored in the memory 21. A CRT display unit 22 attached to the memory 21 displays the shape of the detected contour based on the stored data (step 10). Whether the desired contour is detected or not is confirmed by this CRT display (step 11). If there is any portion in which the contour is complicated, the input may be effected manually for that portion (step 12).

After data concering the entire desired contour is obtained, the data is transferred from the memory 21 to the external memory device 23 such as a floppy disk to be stored according to the instruction of the CPU 12 (step 13). The stored contour data is read in synchronization with the scanning of the original during succeeding step of photoelectric scanning of the original by a color scanner. By turning on and off the image signals for recording at the position of the contour, only the image in (or out of) the region surrounded by contour will be recorded.

The contour data may be the control data for controlling a cutting plotter as in the embodiment described below. In that case, the peel off film is cut and a cut-out mask is formed (step 14).

[SECOND EMBODIMENT]

FIGS. 7 to 11 show the second embodiment of the present invention. This apparatus employs a linear type image sensor rather than a matrix type image sensor as is employed in the first embodiment. The basic structure and the process steps are almost the same as the first embodiment, so that the diagram of the basic structure and the flow chart are omitted.

Figure 7:
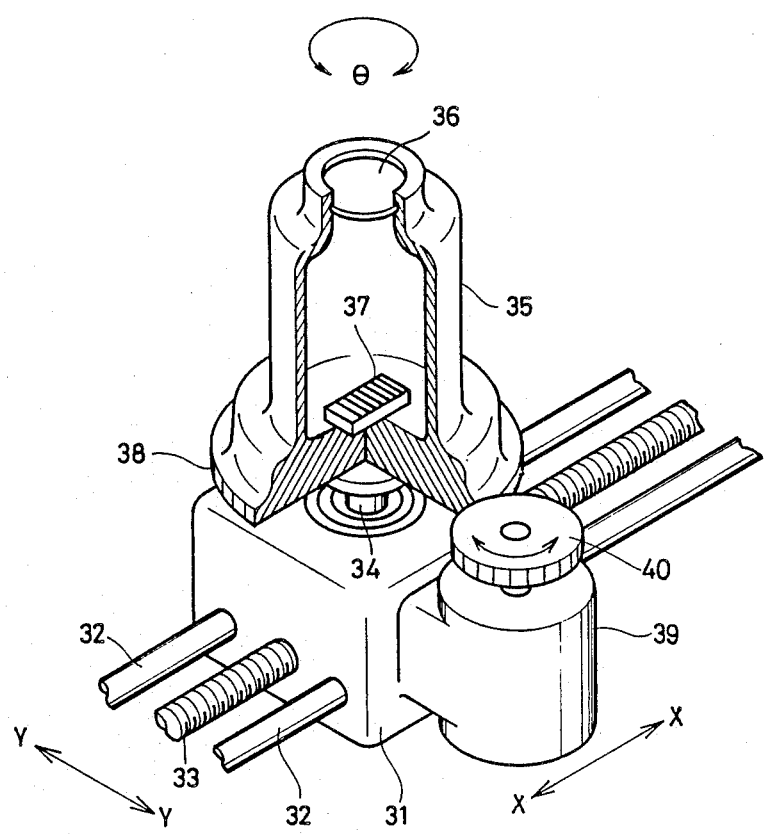
FIG. 7 shows an image contour detecting apparatus employing a linear type image sensor.

FIG. 7 is a perspective view showing a main portion of the image contour detecting apparatus. A digitizer 3, a stylus pen 4 and so on, not shown, are provided in the same manner as in the embodiment of FIG. 3.

Figure 1:
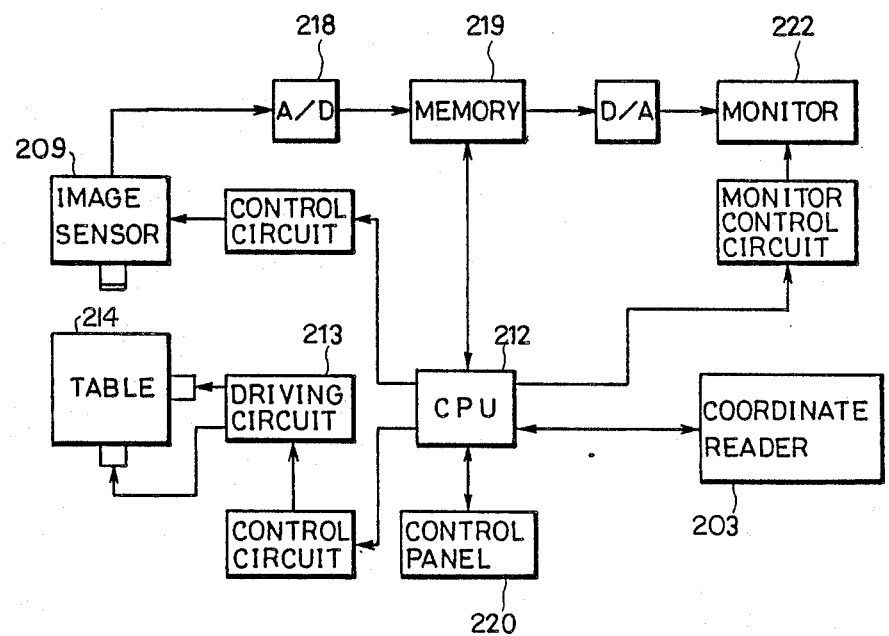
FIG. 1 is a block diagram showing the structure of a conventional image contour data generating apparatus.

A guide axis 32 slidably supporting the carriage 31 in the direction of the X axis and the driving thread 33 are movable in the direction of the Y axis as in the apparatus shown in FIG. 1.

A rotary axis 34 is erected on the center of the upper surface of the carriage 31. A light intercepting case 35 is rotatably supported about the rotary axis 34. An image forming lens 36 is attached on the upper portion of the case 35. A linear type image sensor 37 is attached on the bottom of the case. The linear type image sensor 37 comprises a plurality of photoelectric elements arranged in a line. Gear teeth 38 formed in the periphery of the lower portion of the case 35 engages with gear teeth 40 of the motor 39 vertically attached to a suitable portion of the carriage 31. When the motor 39 is driven, the case 35 rotates around the light axis of the image forming lens 36.

In a manner similar to the first embodiment, the carriage 31 is moved to the position of the X-Y coordinate value outputted by the setting of the stylus pen 4. The light axis of the lens 36 is aligned with the position of the X-Y coordinate value. The case 35 is rotated and the linear type image sensor 37 is controlled in such a manner that the detection of the train of the photoelectric elements is made almost orthogonal to the projected image contour. This is attained by the rotation of the case 35.

Figure 8:
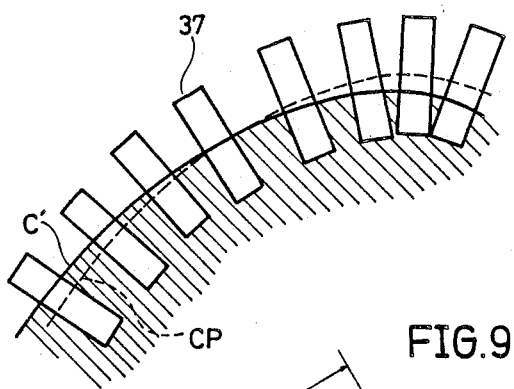
FIG. 8 shows the relation between the moving direction of the linear type image sensor and the direction of the contour.

FIG. 8 shows the relation between the direction of the contour and the direction of the movement of the linear type image sensor. Referring to FIG. 8, the solid line c' is the image contour image. When the trace of the plot points of the stylus pen 4 follows the dotted line CP (slightly deviated from the solid line c'), the center point of the image sensor 37 is on a point on the dotted line CP. The rotation of the case 35 is controlled so that the direction of the photoelectric elements train of the image sensor 37 (hereinafter referred to as the direction of the image sensor) is almost orthogonal to the tangential line of the curve CP at each set point.

This control is effected by the following means. Assuming that the previous position of the stylus pen is ($x_0$, $y_0$) the present position of the stylus pen is ($x_1$, $y_1$), then the direction "$\theta$" ($\theta$ is an angle from the X axis in the counter clockwise direction) of the linear type image sensor is determined by the following equations:

when $y_1 \neq y_0$ $\quad \theta = \tan^{-1}\left(\dfrac{x_0 - x_1}{y_1 - y_0}\right)$ when $y_1 = y_0, x_1 > x_0$ $\quad \theta = \dfrac{\pi}{2}$ when $y_1 = y_0, x_1 < x_0$ $\quad \theta = \dfrac{3}{2}\pi$ The direction for the image sensor 37 is calculated from the coordinate value of each set point of the stylus pen and the coordinate value of the immediately prior position of the stylus pen. Consequently, the rate of rotation of the motor 39 is controlled and the direction of the image sensor 37 at each set point is determined as shown in FIG. 8.

Meanwhile, the following method may be employed to cope with the accumulation of the errors and so on. The direction of the sensor is displayed on the monitor 22. The operator refers to that and the direction of the contour. When the angle formed by the image sensor and contour deviates greatly from the correct angle, the operator corrects it manually.

Thus, at each set point, the image of the image contour portion is projected on the image sensor 37. The projected point is deviated from the central position (the position of the light axis of the lens 36) of the image sensor 37 by an amount corresponding to the error of the set point of the stylus pen, as described above. The image sensor detects the error and finds the coordinate value data of the accurate contour.

Figure 9:
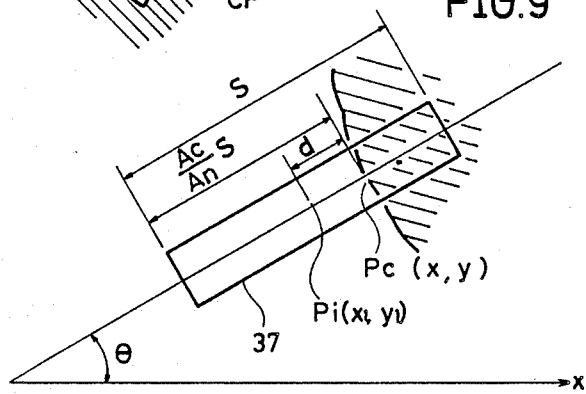
FIG. 9 illustrates the method for finding the coordinate of the accurate outline by using the linear type image sensor.

FIG. 9 illustrates this method. It is assumed that the image sensor 37 is set at an angle $\theta$ with the X axis, and the projected point PC of the image contour is at the distance "d" from the center Pi of the image sensor 37. Where "S" is the entire length of the image sensor (when the magnification rate of projection by the lens 36 is not 1:1, the amount is converted into the dimension of the picture), "An" is the address number corresponding to the entire length of the image sensor, "Ac" is the address number to the contour projected point Pc, the coordinate value (x, y) of the projected point Pc is given by the following equations:

$$x = x_1 + \left(\dfrac{A_c}{An} - \dfrac{1}{2}\right)S\cos\theta$$

$$y = y_1 + \left(\dfrac{Ac}{An} - \dfrac{1}{2}\right)S\sin\theta$$

$$\text{where } \left(\dfrac{Ac}{An} - \dfrac{1}{2}\right)S = d$$

Figure 10:
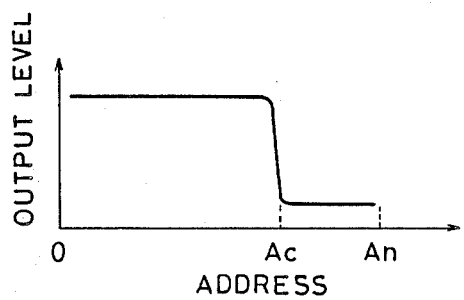
FIG. 10 shows the output state of the sensor when the image contour is projected on the linear type image sensor.

FIG. 10 shows the output state from the sensor when the image contour portion is projected on the linear type image sensor 37. Since the output level changes on the projected point Ac of the contour, the position is obtained by a differential operation.

Thus, the position of the image contour projected on the linear type image sensor 37 is outputted as the X-Y coordinate value.

Figure 11:
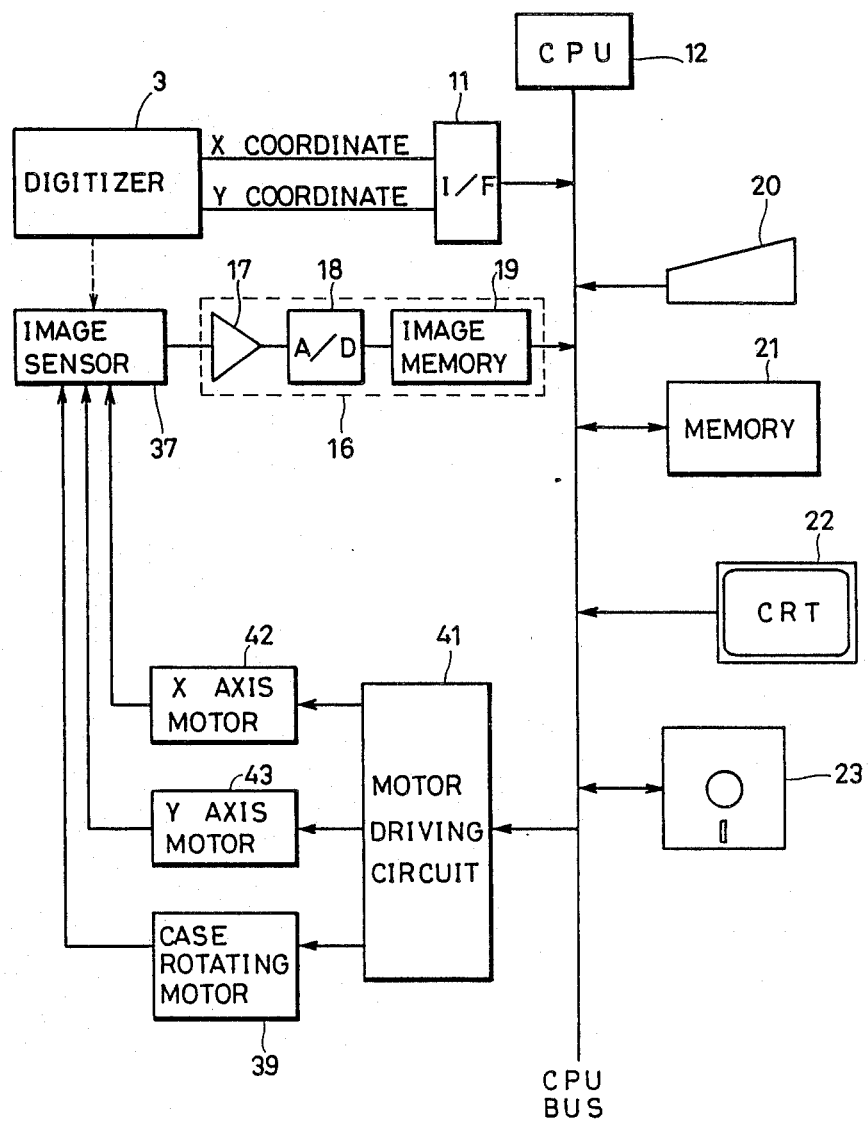
FIG. 11 is a block diagram showing the control system when the linear type image sensor is employed.

FIG. 11 is a block diagram showing the control system of the above described apparatus. The structure thereof is essentially the same as the first embodiment shown in FIG. 4, except that means for rotating the image sensor 37 to control the direction thereof is added. Therefore, description will be omitted for the portions common to FIG. 4.

In this system, the motor driving circuit 41 moves the image sensor by the instruction from the CPU 12. On this occasion, the X axis motor 42, Y axis motor 43 and a third motor 39 for rotating the case 35 containing the image sensor are controlled. In this manner, the image sensor is moved to the X-Y coordinate value set by the stylus pen 4. Simultaneously, the image sensor 37 is rotated in the direction substantially orthogonal to the projected image contour.

The output of the image sensor 37 is processed in the image processing portion 16 in the similar manner as in the first embodiment. By the above described arithmetic operation, the position of the objective image contour is inputted to the memory 21 as a coordinate value data. Consequently, a series of image contour data is successively stored.

In this second embodiment of the invention, the image sensor is linear, the data is of one dimension, and the arithmetic processing required can be simplified, enabling rapid processing.

[THIRD EMBODIMENT]

FIGS. 12 to 19 show a third embodiment of the present invention. The apparatuses of the above described first and second embodiments are only for generating the image contour data. In contrast, the apparatus of the third embodiment comprises means for producing a cut-out mask. The cut-out mask is produced by processing a masking material such as a peel off film based on the contour data. Although the apparatuses of the first and second embodiments generate contour data only for the transparency originals, the apparatus of the third embodiment can be applied both to transparencies and reflection originals.

Figure 12:
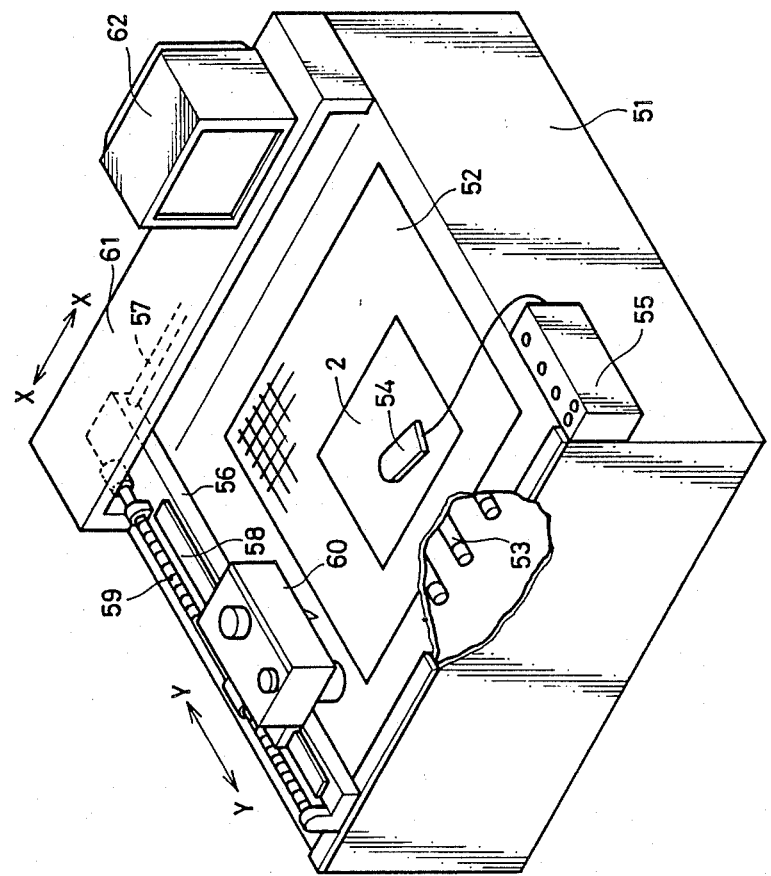
FIG. 12 shows an overview of the image contour data generating apparatus provided with a cut-out mask producing apparatus.

FIG. 12 is a perspective view showing the overview of the apparatus according to the third embodiment.

A digitizer 52 is arranged on the upper surface of the frame 51. The digitizer 52 is a backlight type in which a light source 53 is arranged in the frame 51. The surface thereof is constituted by a translucent material such as a frosted glass, white diffusing plate, and the like.

The original 2 is mounted on the surface of the digitizer 52. A coordinate inputting device 54 is moved to the desired point on the original 2 and the coordinate of the desired point is inputted. Consequently, the X-Y coordinate value of the desired point is outputted. The coordinate inputting device 54 may be a stylus pen similar to that of the first and second embodiments. An operating panel 55 is provided on an appropriate portion on the frame 51.

Meanwhile, a carriage 56 which is driven in the X axis direction by a driving thread 57 is attached on the upper surface of the frame 51. A guide rail 58 in the Y axis direction and a driving thread 59 are provided on the carriage 56. A head 60 is driven along the guide rail 58. A cover 61 and a CRT monitor 62 are arranged in the rear portion of the frame 51.

The head 60 contains an image sensor device and a cutter device.

Figure 13:
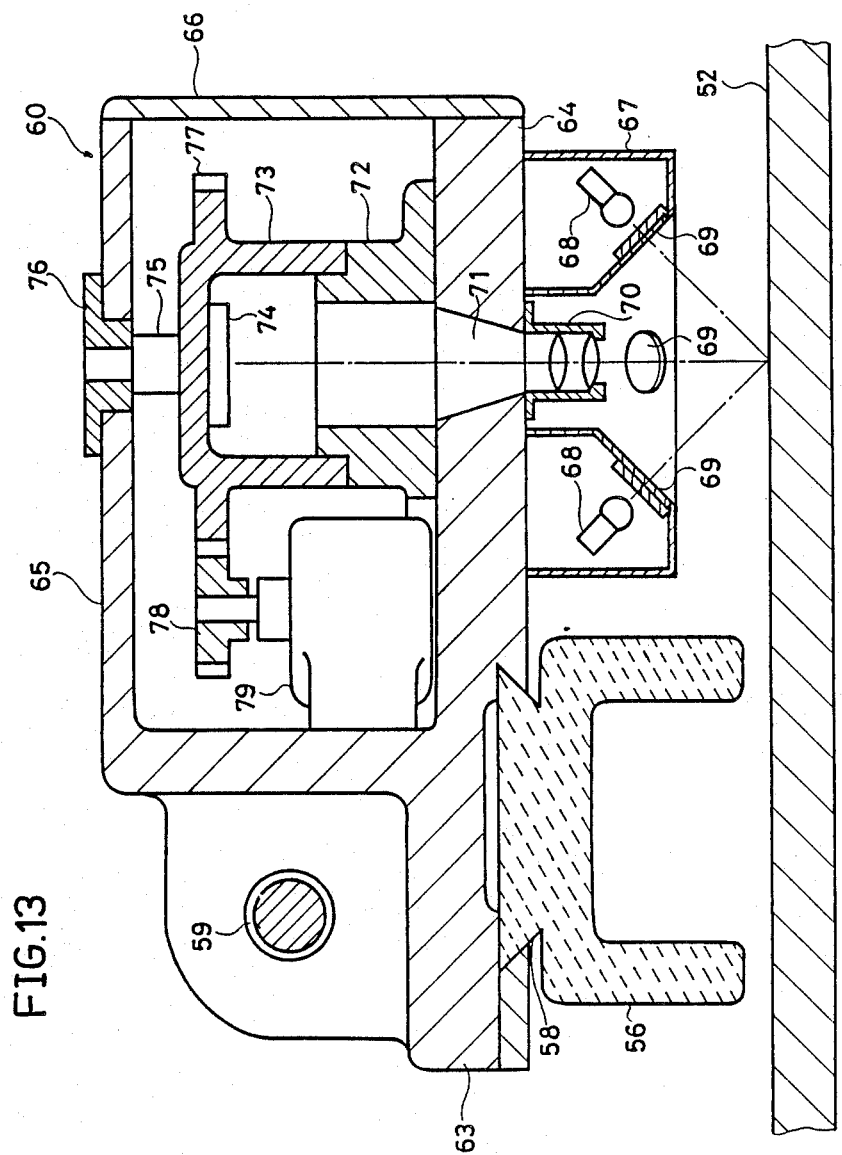
FIG. 13 is a cross sectional view of the image sensor apparatus in which a linear type image sensor is employed.

FIG. 13 is a cross sectional view of the image sensor device in the direction of the X axis. The head 60 includes a base portion 63, which engages with a dovetail groove of the guide rail 58 formed in the carriage 56, a lower plate, an upper plate 65, a cover 66, etc.

A lens 70 is attached to an appropriate portion of the lower surface of the lower plate 64. A light source device for illuminating the reflection original is arranged therearound. The light source device comprises a plurality of lamps 68 arranged in a cylindrical cover 67. The original mounted on the digitizer 52 is illuminated through a respective window 69 provided to pass the light of each lamp in the cover 67.

When the original to be processed is the transparent type such as a photo film, the light source 53 in the frame 51 is viewed. When the original is the reflection type such as a photo print, the lamp 68 provided in the head 60 is used. The flux of light from the surface of the original is projected upward through the lens 70 and a hole 71 provided on the lower plate 64.

A circular bearing 72 is provided on the upper surface of a lower plate 64 coaxially with the light axis of the lens 70. A case 73 for holding the linear type image sensor 74 is attached on the upper portion thereof. The case 73 is in the shape of a cup with its lower portion opened and the lower edge thereof is in fitting engagement with the upper edge of the bearing 72. An axle 75 is erected on the central portion of the upper surface of the case 73. The axle 75 is attached to the bearing 76 provided on the upper plate 65 of the head 60. Consequently, the case 73 is rotatable around the optical axis of the lens 70.

A gear 77 is formed in the outer periphery of the case 73. The gear 77 engages with a minor gear 78 provided on the axis of the motor 79 arranged in the head 60. Consequently, the driving of the motor 79 rotates the case 73, thereby controlling the direction of the linear type image sensor 74.

Figure 14:
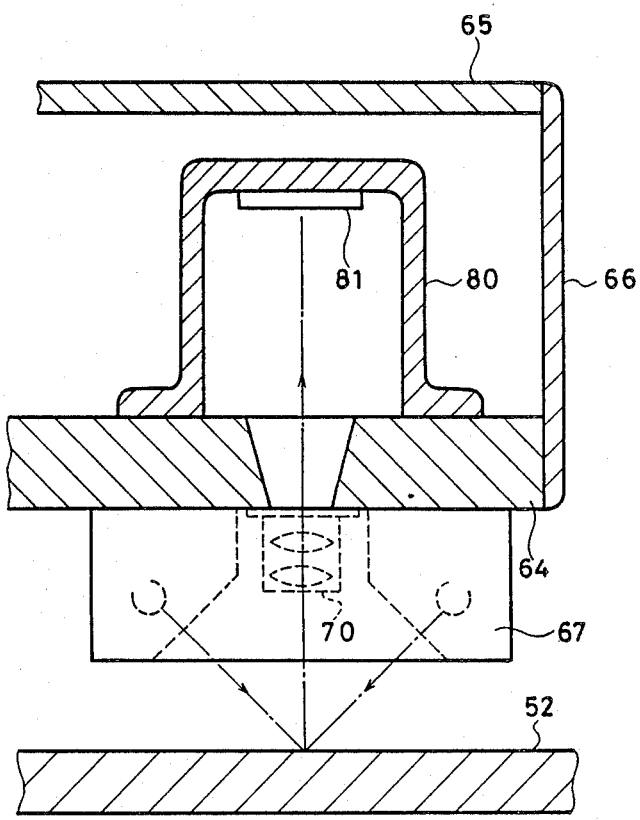
FIG. 14 is a cross sectional view showing an image sensor apparatus in which a matrix type image sensor is employed.

The image sensor may be the matrix type similar to that in the above described embodiment. In that case, the rotary mechanism of the case 73 as described above is not required. FIG. 14 is a cross sectional view of a main portion of one embodiment. A case 80 for holding the image sensor is directly fixed to the lower plate 64. A matrix type image sensor 81 is provided within the case 80.

Figure 15:
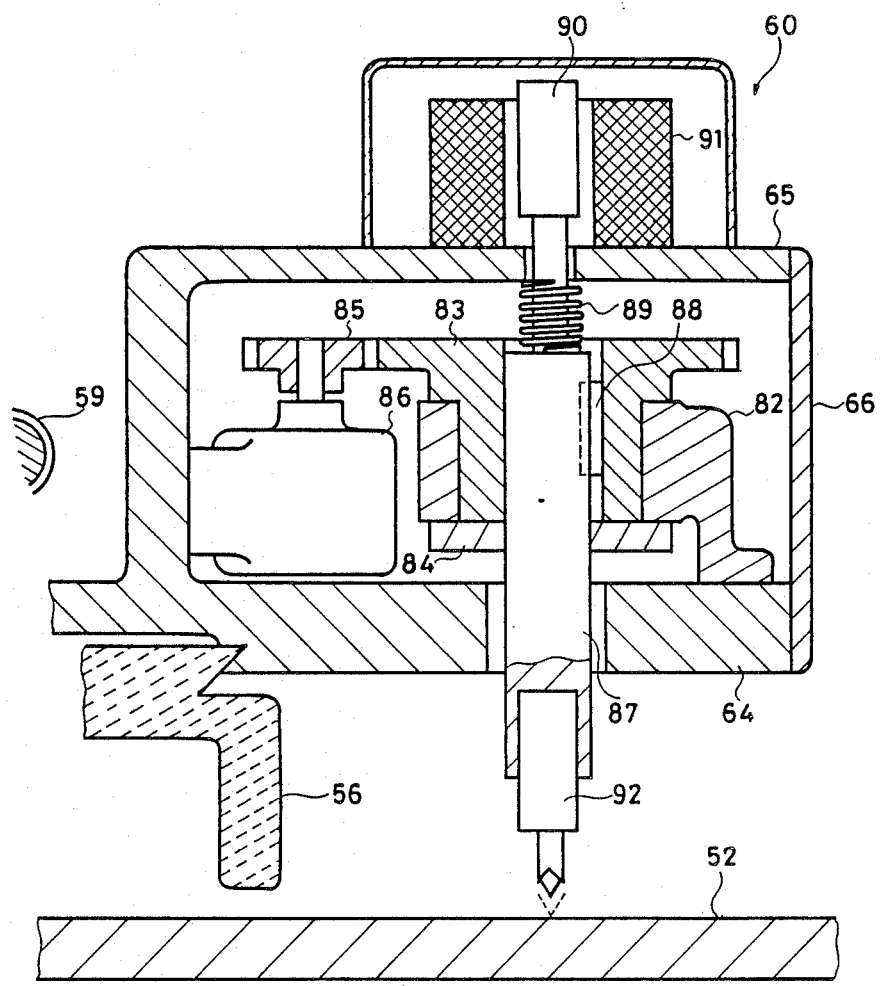
FIG. 15 is a cross sectional view of the cut-out mask producing apparatus.

FIG. 15 is a cross sectional view of a cutter device in the direction of the X axis.

A bearing 82 is provided on the upper surface of the lower plate 64. A gear 83 is attached to the bearing 82. A stopper 84 is provided on the lower end of the boss portion of the gear 83 to regulate the upper and lower position.

The gear 83 engages a minor gear 85 provided on the axis of the motor 86 arranged in the head 60. The gear 83 is rotary driven by the motor 86.

An elevation axle 87 is movable upward and downward in the vertical direction in the center of the gear 83. The rotary power is transmitted to the elevation axle 87 through a parallel key 88. The elevation axle 87 is forced downward by a spring 89 fitted in the smaller dimension portion in the upper portion. The elevation axle 87 penetrates the upper plate 65 above the smaller dimension portion and has a plunger 90 on its upper end. The plunger 90 passes through the center of a solenoid coil 91 provided on the upper plate 65. When the solenoid coil 91 is magnetized, the elevation axle 87 rises against the spring 89.

A cutter blade 92 is provided on the lower end of the elevation axle 87. The direction of the cutter blade 92 is controlled in accordance with the rotation of the gear 83 by the motor 86. When the solenoid coil 91 is not magnetized, the cutter blade 92 is in pressure contact with the peel off film surface mounted on the digitizer 52 by the spring 89. When the solenoid coil 91 is magnetized, the cutter blade is raised and spaced from the peel off film surface.

Figure 16:
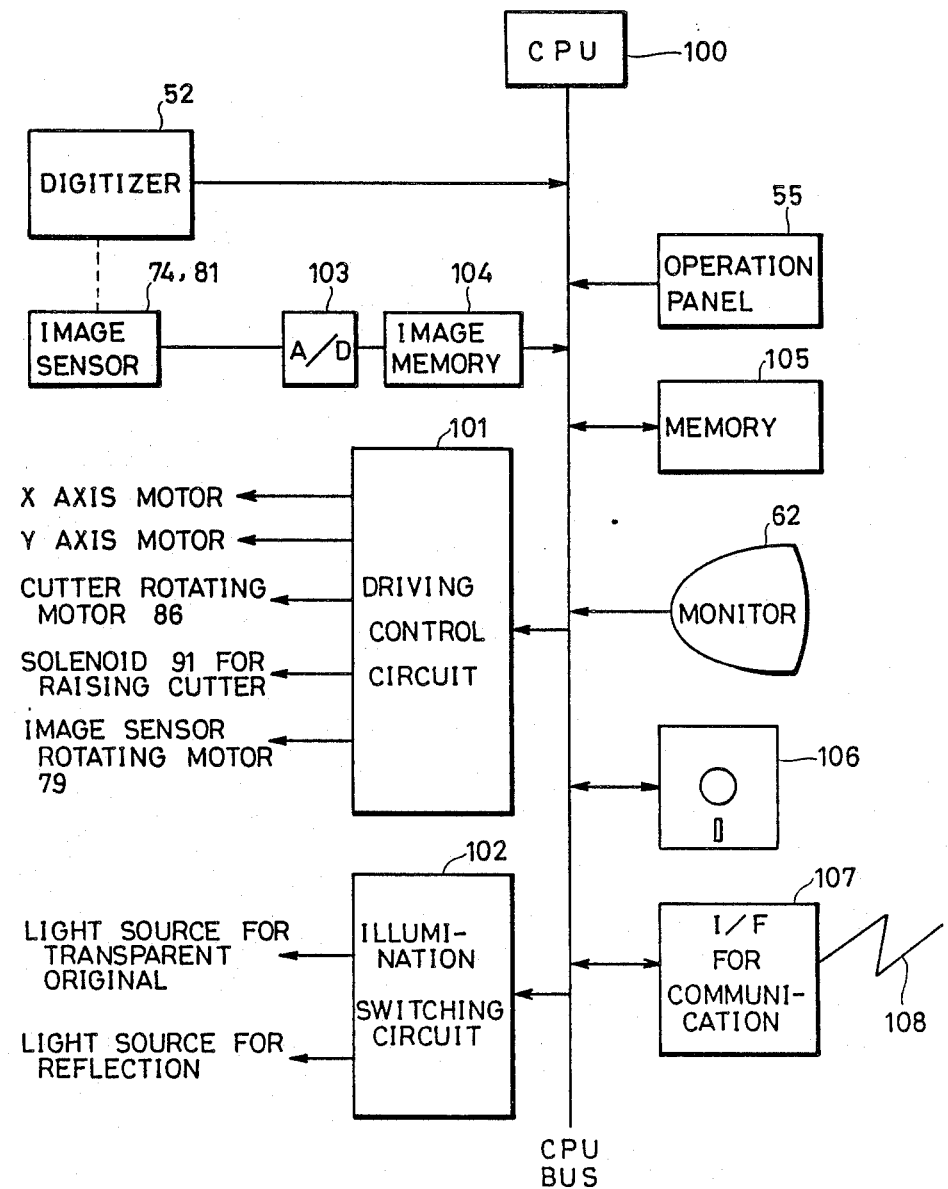
FIG. 16 is a block diagram showing the control system of the image contour data generating apparatus provided with the cut-out mask producing apparatus.

FIG. 16 is a block diagram showing the control system for operating the above described apparatus.

As in the above described embodiments, an original to be processed is mounted on the digitizer 52. The vicinity of the contour surrounding the desired image region is inputted by a coordinate inputting device such as a cursor 54 or a stylus pen. The X-Y coordinate value data of the inputted point is inputted and stored in the memory 105. When the coordinate value is inputted by the cursor or by the stylus pen, the carriage 56 is retracted from the digitizer surface 52 to the side as shown in FIG. 12.

The confirmation and modification of the contour form may be carried out by the display of the contour form based on the X-Y coordinate value data of each plot point.

The CPU 100 outputs an instruction to the driving control circuit 101 based on the coordinate value data stored in the memory 105. The CPU 100 controls the X axis motor driving the carriage 56 and the Y axis motor driving the head 60. Consequently, the light axis of the lens 70 of the image sensor device is successively moved to positions aligned with each plot point. If the image sensor is the linear type shown in FIG. 13, the direction of the image sensor 74 is rotated by the motor 79 so as to be approximately orthogonal to the image contour in the concerned region.

To move the head 60, the solenoid 91 of the cutter device is energized and the cutter blade 92 is separated from the surface of the digitizer 52.

The illumination switching circuit 102 turns on the transparency light source 53 in the frame 51 or the reflection light source 68 on the lower surface of the head 60 in response to the operation from the operation panel 55. The switching is carried out corresponding to the type of the original to be processed, namely, whether it is the transparency original or the reflection original.

The image sensor 74 or 81 outputs the coordinate value data of the image contour through the A/D converter 103 and an image memory 104 in the similar manner as in the above described embodiments. The data is processed in the CPU 100 also in the same manner as described above. Consequently, the counter data surrounding the objective image region is inputted and stored in the memory 105.

The contour data stored in the memory 105 may be transferred to an external memory means 106 such as a floppy disc, as in the above described embodiments, if necessary.

After the contour data of the desired image region is generated, the original is removed from the digitizer 52 and a peel off film is mounted thereon. The peel off film is widely used in photoprocessing for producing a cut-out mask. As is well known, the peel off film comprises a transparent base and a peel layer laminated thereon which can be easily peeled off. The peel layer is a light intercepting film or a transparent film of a safety color, such as red. By cutting and peeling the peel layer in a desired shape, a transparent portion of the desired shape can be formed. A peel off film is mounted on the digitizer 52 and the head 60 is moved along the desired contour shape through the driving control circuit 101 based on the contour data stored in the memory 105 or in the external memory means 106 by the instruction from the CPU 100. Simultaneously, the solenoid 91 of the cutter device is the magnetized. Consequently, the cutter blade 92 is brought into pressure contact with the peel off film surface by the spring 89 and the peel layer is cut. On this occasion, the rotation of the motor 86 is controlled such that the cutter blade 92 always faces the advancing direction of the head 60. The rotation is controlled in a similar manner as the direction of the linear type image sensor is controlled as described above.

Meanwhile, the image sensor device and the cutter device are located at different positions on the head 60. Consequently, the cutting position of the peel off film deviates from the position of the original contour by the distance between both devices. However, basically, if the shape of the cut-out mask formed on the peel off film is coincident with the shape of the desired image region, the mask of the peel off film can be aligned with the desired image region. Therefore, the above mentioned deviation causes no problem practice.

The mounting position of the peel off film and the mounting position of the original may be aligned by deviating both from each other by the amount corresponding to the distance between the image sensor device and the cutter device.

If the dimensions of the peel off film and the original are as large as the digitizer and there is no margin for mounting them with deviation, the following method is employed. Namely, in the cutting process of the peel off film, a desired amount of correction is added to the coordinate value data stored in the memory 105 or in the external memory means 106. By controlling the position of the head 60 by that data, a cut-out mask can be formed on the same position as the contour of the original. More specifically, as shown in FIG. 12, if the cutter device is arranged separated from the image sensor device in the direction of the Y axis, a modification amount ($\Delta Y$ or $-\Delta Y$) which is equal to the space between both devices is added to the Y coordinate value of the stored coordinate value data to control the position of the head 60.

The apparatus according to the above described third embodiment of the invention is an image contour data generating and cut-out mask producing apparatus which is capable of generating the image contour data and producing a cut-out mask based on the data in one apparatus. Since both are driven by the same control system, a cut-out mask of extremely high precision can be formed.

The control system shown in FIG. 16 includes an interface 107 for communication. The interface 107 is provided to effect the generation of the contour data and the production of the cut-out mask in the separate image contour data generating and cut-out mask producing device provided in parallel. This increases the operation efficiency. The data stored in the memory 105 or in the external memory means 106 can be transferred to another device through the communication line 108 and the data can be received from the other apparatus. In addition, it can be applied when the contour data is directly transferred to a color scanner for recording only the desired image region at the time of scanning and recording the original.

[ADDITIONAL EXAMPLES]

Figure 17:
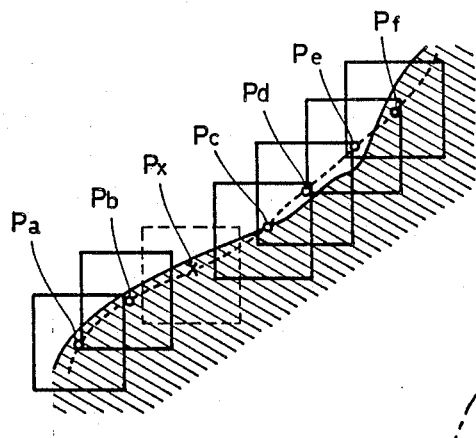
FIG. 17 shows the relation between the outline position and the approximate position when the image contour is continuously detected by a matrix type image sensor.
Figure 18:
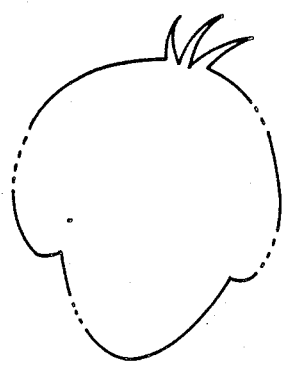
FIG. 18 shows a contour the detection of which is difficult.
Figure 19:
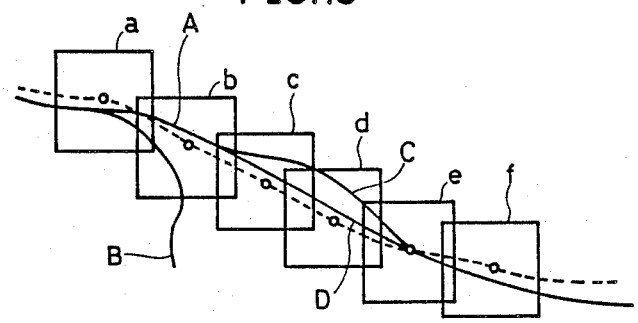
FIG. 19 shows a case in which there are a plurality of contours.

FIGS. 17 to 19 show troublesome cases which are occasionally occur when generating the image contour data by the apparatus of the present invention and the steps which may be followered to overcome these problems.

FIG. 17 shows the manner of detecting the image contour projected in the image sensor region for each position with the center of matrix type image sensor being successively moved to the positions of the plotted points (Pa) (Pb) (Pc) (Pd) (Pe) (Pf) by the stylus pen or a cursor. In this case, the pitch between the plotted points Pa and Pb and the pitches between each of the plot points following the point Pc are set to be smaller than the dimension of the image sensor region. The regions covered by the image sensor for each position appropriately overlap with each other. Consequently, the image contour is detected without a break. However, the space between the plot points Pb and Pc is larger than the dimension of the region which can be covered by the image sensor. Therefore, there is a break in this portion.

In this case, an intermediate plot point Px is set by an interpolation operation based on the coordinate value data of the preceding and succeeding plot points. A continuous image contour data can be generated by processing the intermediate plot point Px in a manner similar to that of the other plot points.

FIG. 18 shows a case where there is no or very little difference in the density or tone between images on both sides of the objective contour and the detection of the contour by the image sensor is impossible. In this case, the display of the contour on the monitor 22 or 62 by the input of the coordinate value of the plot point is utilized. The mode of display on the monitor for the portions of the contour detected by the image sensor and the portions of the contour which are not detected are made different from each other. For example, the detected portions are displayed by the solid line and the portions which are not detected are displayed by the dotted line. Various means may be applied such as switching on and off the portions which can not be detected, changing the intensity, change the color of the display using a color CRT as a monitor and so on. In this case, for the contour portions which can not be detected, the operator moves the cursor on the digitizer for interpolation to establish the data.

FIG. 19 shows a case in which a plurality of contours are simultaneously projected on the image sensor at the branch of the image contour or portions where a plurality of contours are close to each other. When the image sensor is in the positions a and b, the contour branching off in A and B is detected. In this step, both contour data are written in the memory. When the image sensor moves to the position of c, the contour B is outside of the imaging area of the image sensor and is not detected. In this step, it is determined that B is not the contour to be detected. The data for the contour B is the eliminated from the data written in the memory.

At positions c, d and e, two branching contours C and D are detected. In this case, both of the contours are in the region of the image sensor. The two contours merge with each other at position e. Consequently, the automatic determination and elimination of the not-desired contour are difficult. In this case, both contours are displayed on the monitor and the unnecessary contour data is eliminated by the determination of the operator.

As described above, according to the present invention, the image contour data generating apparatus comprises original film holding means for holding an original film the image contour of which is desired, approximate outline position input means such as a digitizer connected to the original film holding means for inputting the approximate position on the original film, contour position detecting means such as an image sensor coupled to the original film holding means and moved to the inputted approximate position for detecting the accurate image contour position at that position, arithmetic means for operating an absolute contour position on the film from the said approximate position and the accurate contour position data, and memory means for storing the operated absolute contour position data.

Since the image contour data input apparatus is structured as described above, the approximate position input and the accurate contour position detection for the film from which data is read are carried out on the same place. Consequently, an image contour data generating apparatus can be obtained in which no reading error occurs.

Although the present invention has been described and illustrated in detail, it is clearly understood that the same is by way of illustration and example only and is not to be taken by way of limitation, the scope of the present invention being limited only by the terms of the appended claims.

What is claimed is:

1. Image contour data generating apparatus, comprising:
   a single integrated inputting unit comprising an original film holding means, a scanning position input means and a contour position detecting means;
   said original film holding means being effective for holding an original film having an image thereon, said image having an image contour to be detected;
   said scanning position input means being effective for permitting an operator of said apparatus to identify a scanning position on said film holding means, and therefore a scanning position on said original film, corresponding to a selected portion of said image contour;
   said contour position detecting means including a scanning image sensor and being effective for moving said scanning image sensor to said scanning position, while said original film remains positioned at said original film holding means, said contour position detecting means being further effective for causing said image sensor to scan an area of said original film corresponding to said portion of said image contour and for generating an output signal indicative of said scanned area of said original film scanned by said image sensor; and
   arithmetic means for determining an actual contour of said selected portion of said image contour on the basis of said output signal.

2. An image contour data generating apparatus according to claim 1 further including memory means for storing said actual contour of said selected portion of said image contour determined by said arithmetic means.

3. An image contour data generating apparatus according to claim 1, wherein said original film holding means, said scanning position input means and said contour position detecting means are all part of a single unit.

4. An image contour data generating apparatus according to claim 3, wherein said contour position detecting means an image sensor for reading image contour position of said original includes image processing means for generating said output signal as a function of an output of said image sensor.

5. An image contour data generating apparatus according to claim 4, wherein said scanning position input means comprises a digitizer which outputs the scanning position as a x, y coordinate.

6. An image contour data generating apparatus according to claim 5, wherein said image sensor comprises a linear type image sensor having a plurality of photoelectric elements arranged in a line and wherein said linear type image sensor is rotatable about said inputted scanning position.

7. An image contour data generating apparatus according to claim 6, wherein said photoelectric element comprises a charge coupled device.

8. An image contour data generating apparatus according to claim 5, wherein said image sensor comprises a matrix type image sensor having a plurality of photoelectric elements arranged in a lattice.

9. An image contour data generating apparatus according to claim 8, wherein the direction of the arrangement of said photoelectric elements in said matrix image sensor is coincident with the x, y coordinate direction of said digitizer.

10. An image contour data generating apparatus according to claim 9, wherein said photoelectric elements comprise a charge coupled device.

11. An image contour data generating apparatus according to claim 4, which further comprises cut-out mask producing means for producing a cut-out mask based on said actual contour determined by said arithmetic means.

12. An image contour data generating apparatus according to claim 11, wherein said scanning position input means comprises a digitizer which identifies the scanning position as a x, y coordinate.

13. An image contour data generating apparatus according to claim 12, wherein said image sensor comprises a matrix type image sensor having a plurality of photoelectric elements arranged in a lattice.

14. An image contour data generating apparatus according to claim 13, wherein the direction of the arrangement of said photoelectric elements in said matrix image sensor is coincident with the x, y coordinate direction of said digitizer.

15. An image contour data generating apparatus according to claim 13, wherein said photoelectric elements comprises a charge coupled device.

16. An image contour data generating apparatus according to claim 12, wherein said image sensor comprises a linear type image sensor having a plurality of photoelectric elements arranged in a line and wherein said linear type image sensor is rotatable about said inputted scanning position.

17. An image contour data generating apparatus according to claim 16, wherein said photoelectric elements comprises a charge coupled device.

18. A method for generating desired image contour data concerning a contour of an image contained on a film, said method comprising the steps of:
   placing said original film on a film holding surface;
   identifying a scanning position on said original film corresponding to a selected portion of said image contour;
   moving a scanning image sensor to said scanning position, while said film remains positioned at said film holding surface, and causing said image sensor to scan an area of said original film corresponding to said portion of said image contour and generating an output signal indicative of the scanned area of the original film scanned by the image sensor; and
   arithmetically determining an actual contour of said selected portion of said image contour as a function of said output signal.

19. A method for generating a desired image contour data according to claim 18, which further comprises the step of producing a desired cut-out mask using cut-out mask producing means for producing a cut-out mask based on the actual contour determined arithmetically.

20. A method for generating desired image contour data concerning a contour of an image contained on a film, said method comprising the steps of:
   (a) placing said original film on a film holding surface;
   (b) identifying a scanning position on said original film corresponding to a selected portion of said image contour;
   (c) moving a scanning image sensor to said scanning position, while said film remains positioned at said film holding surface, and causing said image sensor to scan an area of said original film corresponding to said portion of said image contour and generating an output signal indicative of the scanned area of the original film scanned by the image sensor;
   (d) arithmetically determining an actual contour of said selected portion of said image contour as a function of said output signal; and
   (e) repeating steps (b)–(d) for a plurality of adjacent scanning positions corresponding to adjacent selected portions of said image contour and interpolating an actual image contour of said original film for those portions of said actual contour which are located between two adjacent areas scanned by said image sensor, but are not actually scanned by said image sensor.

21. A method for generating desired image contour data concerning a contour of an image contained on a film, said method comprising the steps of:
   (a) placing said original film on a film holding surface;
   (b) identifying a plurality of scanning positions on said original film, each scanning position corresponding to a different selected portion of said image contour;
   (c) moving a scanning image sensor to each of said scanning positions, while said film remains positioned at said film holding surface, and causing said image sensor to scan areas of said original film corresponding to said portions of said image contour and generating an output signal indicative of the scanned areas of the original film scanned by the image sensor, said original film having areas where a density or tone between images on both sides of the image contour are sufficient and areas where a density or tone between images on both sides of the image contour are insufficient to automatically determine the actual contour of the image contour;
   (d) arithmetically determining an actual contour of each selected portion of said image contour where the density or tone between images on both sides of the image contour is sufficiently great to enable such detection as a function of said output signal; and
   (e) displaying an image of the original film on a monitor and indicating on said monitor those scanned areas wherein the difference in density or tone between images on both sides of said image contour in such area is sufficient to enable the actual contour of said selected portion of said image contour to be determined.

22. A method for generating desired image contour data concerning a contour of an image contained on a film, said method comprising the steps of:
   (a) placing said original film on a film holding surface;
   (b) identifying a plurality of adjacent scanning positions on said original film corresponding to overlapping portions of said image contour;
   (c) moving a scanning image sensor to each of said scanning positions, while said film remains positioned at said film holding surface, and causing said image sensor to scan overlapping areas of said original film corresponding to said overlapping portions of said image contour and generating an output signal indicative of the scanned areas of the original film scanned by the image sensor, at least some of said scanned areas having more than one image contour line therein; and
   (d) arithmetically determining each actual contour of said selected portion of said image contour as a function of said output signal and displaying on an output device those lines of actual contour which extend into at least three adjacent areas scanned by said image sensor.

23. Apparatus for generating desired image contour data concerning a contour of an image contained on a film, said apparatus comprising:
   (a) a single integrated inputting unit comprising a film holding means, a means for identifying a scanning image position, a scanning image sensor, and means for moving said image sensor;
   (b) said identifying means being effective for identifying a scanning position on said original film corresponding to a selected portion of said image contour;
   (c) said means for moving said scanning image sensor being effective to move said image sensor to said scanning position while said film remains positioned at said film holding means and for causing said image sensor to scan an area of said original film corresponding to said portion of said image contour and generating an output signal indicative of the scanned area of the original film scanned by the image sensor;
   (d) means for arithmetically determining an actual contour of said selected portion of said image contour as a function of said output signal; and
   (e) means for repeating the functions carried out in paragraphs (b)-(d) for a plurality of adjacent scanning positions corresponding to adjacent selected portions of said image contour and interpolating an actual image contour of said original film for those portions of said actual contour which are located between two adjacent areas scanned by said image sensor, but are not actually scanned by said image sensor.

24. Apparatus for generating desired image contour data concerning a contour of an image contained on a film, said apparatus comprising:
   (a) a single integrated inputting unit comprising a film holding means; identifying means, a scanning image sensor; and means for moving said scanning image sensor;
   (b) said identifying means being effective for identifying a plurality of scanning positions on said original film, each scanning position corresponding to a different selected portion of said image contour;
   (c) said means for moving said scanning image sensor being effective for moving said scanning image sensor to each of said scanning positions while said film remains positioned at said film holding means and for causing said image sensor to scan areas of said original film corresponding to said portions of said image contour and generating an output signal indicative of the scanned areas of the original film scanned by the image sensor, said original film having areas where the density or tone between images on both sides of the image contour are sufficient and areas where a density or tone between images on both sides of the image contour are insufficient to automatically determine the actual contour of the image contour;
   (d) means for arithmetically determining an actual contour of each selected portion of said image contour where the density or tone between images on both sides of the image contour is sufficiently great to enable such detection as a function of said output signal; and
   (e) means for displaying an image of the original film on a monitor and indicating on said monitor those scanned areas wherein a difference in density or tone between images on both sides of said image contour in such area is sufficient to enable the actual contour of said selected portion of said image contour to be determined.

25. Apparatus for generating desired image contour data concerning contours of an image contained on a film, said apparatus comprising:
   (a) means for identifying a plurality of adjacent scanning positions on said original film corresponding to overlapping portions of said image contour;
   (b) means for moving a scanning image sensor to each of said scanning positions and causing said image sensor to scan overlapping areas of said original film corresponding to said overlapping portions of said image contour and generating an output signal indicative of the scanned areas of the original film scanned by the image sensor, at least some of said scanned areas having more than one image contour line therein; and
   (c) means for arithmetically determining each actual contour of said selected portion of said image contour as a function of said output signal and displaying on an output device those lines of actual contour which extend into at least three adjacent areas scanned by said image sensor.

26. Image contour data generating apparatus, comprising:
   original film holding means for holding an original film having an image on a holding surface thereof, said image having a contour to be detected;
   scanning position input means for designating a scanning coordinate on said holding surface, said scanning position input means generating a scanning coordinate signal corresponding to said scanning coordinate;
   an image sensor for scanning a partial area of said holding surface, said image sensor generating an image signal;
   moving means for moving said image sensor to a scanning position on said holding surface in response to an output of said scanning coordinate signal generated by said scanning position input means, said scanning position corresponding to said scanning coordinate signal;
   detecting means for detecting a contour coordinate of said image within said partial area on the basis of said image signal generated by said image sensor, said detecting means generating a contour coordinate signal;
   arithmetic means for correcting said scanning coordinate signal on the basis of said contour coordinate signal, thereby to generate an actual contour coordinate signal for said partial area of said image.

* * * * *